(12) United States Patent
Kojima et al.

(10) Patent No.: US 12,270,352 B2
(45) Date of Patent: Apr. 8, 2025

(54) VEHICLE CONTROL METHOD, AND VEHICLE CONTROL DEVICE

(71) Applicant: NISSAN MOTOR CO., LTD., Yokohama (JP)

(72) Inventors: Akira Kojima, Kanagawa (JP); Tetsuya Fuke, Kanagawa (JP); Masashi Morikawa, Kanagawa (JP); Kazuhiro Oomichi, Kanagawa (JP); Kouhei Kobayashi, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 18/574,688

(22) PCT Filed: Jun. 28, 2021

(86) PCT No.: PCT/JP2021/024271
§ 371 (c)(1),
(2) Date: Dec. 27, 2023

(87) PCT Pub. No.: WO2023/275910
PCT Pub. Date: Jan. 5, 2023

(65) Prior Publication Data
US 2024/0295196 A1    Sep. 5, 2024

(51) Int. Cl.
*F02D 41/00* (2006.01)
*F02B 37/16* (2006.01)
(Continued)

(52) U.S. Cl.
CPC .......... *F02D 41/0215* (2013.01); *F02B 37/16* (2013.01); *F02B 37/18* (2013.01);
(Continued)

(58) Field of Classification Search
CPC .......... F02D 41/0215; F02D 2200/101; F02D 2200/50; F02B 37/16; F02B 37/18; F02P 5/1504
See application file for complete search history.

(56) References Cited

U.S. PATENT DOCUMENTS 4,693,225 A * 9/1987 Abe ........................ F02D 21/08
477/107
5,081,887 A * 1/1992 Kato ...................... B60W 10/11
477/33
(Continued)

FOREIGN PATENT DOCUMENTS

JP    H03-015633 A    1/1991
JP    H05-256157 A    10/1993
(Continued)

*Primary Examiner* — Phutthiwat Wongwian
*Assistant Examiner* — Sherman D Manley
(74) *Attorney, Agent, or Firm* — Foley & Lardner LLP (57) ABSTRACT

When a vehicle accelerates due to an upshifting of a transmission, a recirculation valve is opened and ignition period is retarded so that the torque generated in an internal combustion engine decreases. When upshifting of the transmission of the vehicle is completed, retarding of the ignition period is ended and the recirculation valve is closed at different timings. As a result, the amount of torque recovery at the end of the upshifting of the transmission of the vehicle can be prevented from increasing more than expected, and the acceleration rate after the shift can be reduced.

7 Claims, 5 Drawing Sheets

(51) Int. Cl.
*F02B 37/18* (2006.01)
*F02D 41/02* (2006.01)
*F02P 5/15* (2006.01)

(52) U.S. Cl.
CPC ...... *F02P 5/1504* (2013.01); *F02D 2200/101* (2013.01); *F02D 2200/50* (2013.01)

(56) References Cited

U.S. PATENT DOCUMENTS

| | | | | |
|---|---|---|---|---|
| 5,658,217 | A * | 8/1997 | Tsukada | B60W 10/04 |
| | | | | 477/109 |
| 7,389,176 | B2 * | 6/2008 | Kadono | B60W 10/101 |
| | | | | 477/111 |
| 8,967,118 | B2 * | 3/2015 | Whitney | F02D 13/0219 |
| | | | | 123/406.23 |
| 9,732,684 | B2 * | 8/2017 | Yasui | F02D 41/0007 |
| 2007/0192015 | A1 * | 8/2007 | Konishi | F02D 41/1497 |
| | | | | 73/114.11 |
| 2009/0018733 | A1 * | 1/2009 | Livshiz | F02D 11/105 |
| | | | | 701/54 |
| 2009/0118968 | A1 * | 5/2009 | Livshiz | F02D 37/02 |
| | | | | 701/102 |
| 2009/0183507 | A1 * | 7/2009 | Weaver | F02D 43/02 |
| | | | | 60/602 |
| 2010/0268436 | A1 * | 10/2010 | Soejima | F02D 37/02 |
| | | | | 701/102 |
| 2011/0045948 | A1 * | 2/2011 | Doering | B60W 10/11 |
| | | | | 477/33 |
| 2011/0257854 | A1 * | 10/2011 | Whitney | B60W 50/0097 |
| | | | | 701/54 |

FOREIGN PATENT DOCUMENTS

| | | |
|---|---|---|
| JP | 2015-094288 A | 5/2015 |
| JP | 2017-008898 A | 1/2017 |
| JP | 2017-172417 A | 9/2017 |

* cited by examiner

VEHICLE CONTROL METHOD, AND VEHICLE CONTROL DEVICE

TECHNICAL FIELD

The present invention relates to a vehicle control method and a vehicle control device.

BACKGROUND ART

Patent Document 1 discloses an art for retarding an ignition timing of an internal combustion engine in response to upshift during vehicle traveling and, upon this retardation control, opening an air bypass valve in response to satisfaction of a predetermined air bypass condition. The air bypass valve is disposed in an air bypass connected to an intake passage, so as to bypass a compressor of a supercharger.

Patent Document 1 serves to lower a boost pressure by opening the air bypass valve, when the retardation control on the ignition timing has raised thermal energy of exhaust gas and thereby raised turbine work of the supercharger.

However, in case that the retardation control on the ignition timing terminates at a timing overlapping with a timing of closing the air bypass valve, the system of Patent Document 1 may undergo generation of a torque greater than expected, increase in vehicle acceleration, and deterioration in traveling performance.

PRIOR ART DOCUMENT(S)

Patent Document(s)

Patent Document 1: JP 2017-172417 A

SUMMARY OF THE INVENTION

According to one aspect of the present invention, a vehicle is configured to: open the recirculation valve and retard an ignition timing, in response to upshift of the transmission; and implement termination of the retardation of the ignition timing and closure of the recirculation valve at different timings, in response to completion of the upshift of the transmission.

The vehicle according to the above aspect of the present invention serves to suppress an amount of torque recovery subsequent to the completion of the upshift of the transmission from increasing more than expected, and thereby reduce an acceleration of the vehicle after gear change.

MODE(S) FOR CARRYING OUT THE INVENTION

The following details an embodiment of the present invention with reference to the drawings.

Figure 1:
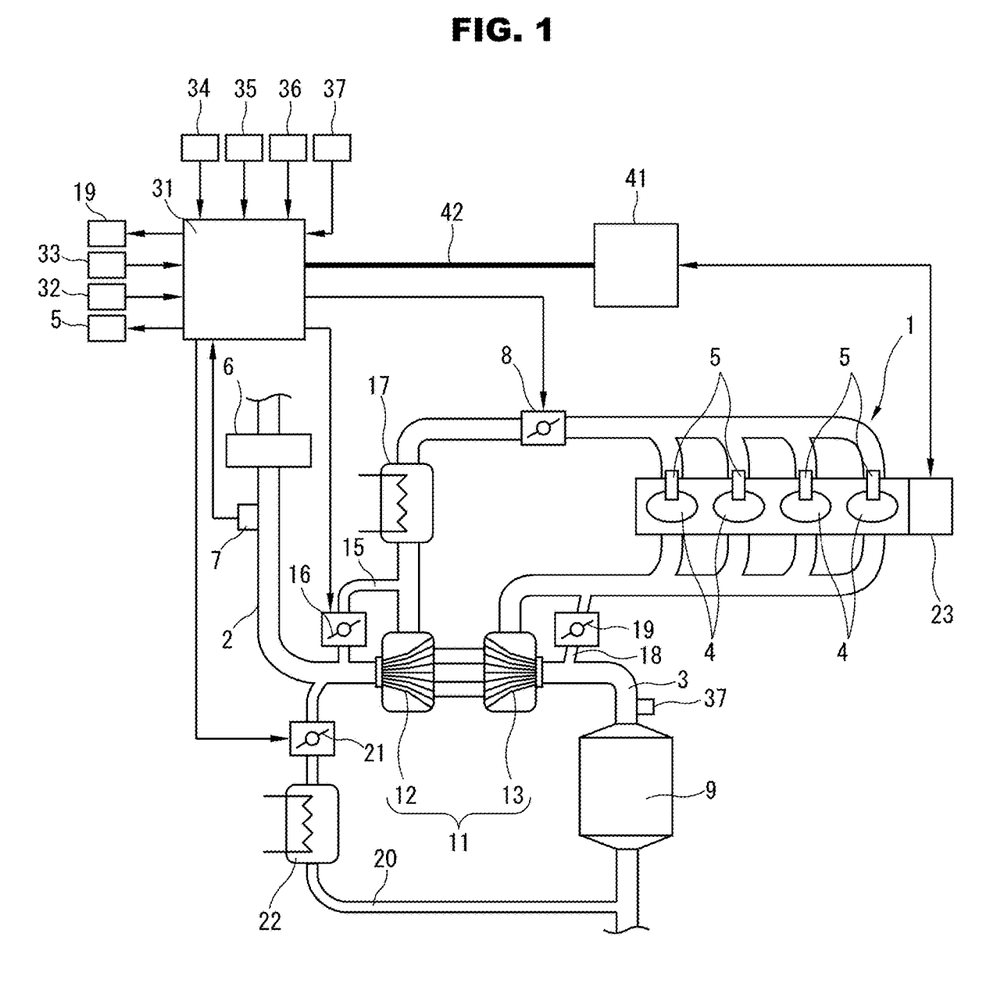
FIG. 1 is an illustrative view schematically showing an example of system configurations of an internal combustion engine mounted to a vehicle to which the present invention is applied.

FIG. 1 is an illustrative view schematically showing an example of system configurations of an internal combustion engine 1 mounted to a vehicle to which the present invention is applied. Internal combustion engine 1 is a so-called reciprocating internal combustion engine structured to generate motive power by converting linear reciprocating motion of pistons not shown into rotational motion of a crank shaft not shown.

Internal combustion engine 1 includes an intake passage 2 and an exhaust passage 3. Intake passage 2 is connected to combustion chambers 4 via intake valves not shown. Exhaust passage 3 is connected to combustion chambers 4 via exhaust valves not shown.

Internal combustion engine 1 is structured to directly inject fuel such as gasoline into combustion chambers 4 with use of fuel injectors not shown. The fuel injected from the fuel injectors is ignited inside combustion chambers 4 with use of spark plugs 5. The fuel injectors may be ones structured to inject fuel into intake ports of internal combustion engine 1.

Intake passage 2 is provided with an air cleaner 6, an air flow meter 7, and an electric throttle valve 8. Air cleaner 6 collects foreign substances contained in intake air. Air flow meter 7 measures an amount of intake air. Throttle valve 8 has an opening degree controlled in accordance with control signals from a control unit 31 described below.

Air flow meter 7 is disposed upstream with respect to throttle valve 8. Air cleaner 6 is disposed upstream with respect to air flow meter 7.

Exhaust passage 3 is provided with an exhaust catalyst device 9 such as a three-way catalyst.

Internal combustion engine 1 further includes a supercharger 11 (e.g., a turbocharger) structured to supercharge intake air. Supercharger 11 includes a compressor 12 and an exhaust turbine 13 that are arranged coaxially with each other. Compressor 12 is disposed in intake passage 2, and is positioned upstream with respect to throttle valve 8 and downstream with respect to air flow meter 7. Exhaust turbine 13 is a turbine disposed in exhaust passage 3, and is positioned upstream with respect to exhaust catalyst device 9.

Intake passage 2 is connected to a recirculation passage 15 bypassing compressor 12 and connecting a point upstream with respect to compressor 12 and a point downstream with respect to compressor 12. In other words, recirculation passage 15 includes a first end connected to intake passage 2 at the point upstream with respect to compressor 12 and a second end connected to intake passage 2 at the point downstream with respect to compressor 12.

Recirculation passage 15 is provided with an electric recirculation valve 16 structured to release boost pressure from a downstream side to an upstream side with respect to compressor 12. Recirculation valve 16 is opened and closed under control of control unit 31. Basically, recirculation valve 16 is opened upon deceleration of the vehicle and closed upon acceleration of the vehicle.

Intake passage 2 is further provided with an intercooler 17 disposed upstream with respect to throttle valve 8 and downstream with respect to the second end of recirculation passage 15. Intercooler 17 cools intake air compressed and pressurized in compressor 12, and thereby serves to improve a charging efficiency.

Exhaust passage 3 is connected to an exhaust bypass 18 bypassing exhaust turbine 13 and connecting a point upstream with respect to exhaust turbine 13 and a point downstream with respect to exhaust turbine 13. Exhaust bypass 18 includes a downstream-side end connected to exhaust passage 3 at a point upstream with respect to exhaust catalyst device 9. Exhaust bypass 18 is provided with an electric waste gate valve 19 that controls an exhaust flow amount inside exhaust bypass 18. Waste gate valve 19 is structured to bypass a part of exhaust gas to be introduced into exhaust turbine 13 to the point downstream with respect to exhaust turbine 13, and thereby control a boost pressure of internal combustion engine 1. Waste gate valve 19 is opened and closed under control of control unit 31.

Internal combustion engine 1 is structured to perform exhaust gas recirculation (EGR) to introduce (i.e., return) a part of exhaust gas as EGR gas from exhaust passage 3 to intake passage 2, and includes an EGR passage 20 that branches off from exhaust passage 3 and is connected to intake passage 2. EGR passage 20 includes a first end connected to exhaust passage 3 at a point downstream with respect to exhaust catalyst device 9, and includes a second end connected to intake passage 2 at a point downstream with respect to air flow meter 7 and upstream with respect to compressor 12. EGR passage 20 is provided with an electric EGR valve 21 structured to control a flow amount of EGR gas in EGR passage 20 and an EGR cooler 22 structured to cool EGR gas. EGR valve 21 is opened and closed under control of control unit 31.

Internal combustion engine 1 is mounted to the vehicle in combination with a transmission 23 that is stepped and automatic, and drives drive wheels of the vehicle via the transmission 23 and a final reduction gear not shown. Transmission 23 may be a manual transmission.

Control unit 31 serving as a controller is a known digital computer including a CPU, a ROM, a RAM, and an input-output interface.

Control unit 31 receives, in addition to a measurement signal from air flow meter 7, measurement signals from various sensors such as: a vehicle speed sensor 32 measuring a vehicle speed of the vehicle; a crank angle sensor 33 measuring a crank angle of the crank shaft of internal combustion engine 1; an accelerator opening sensor 34 measuring a depression amount of an accelerator pedal; a boost pressure sensor 35 measuring the boost pressure; an atmospheric pressure sensor 36 measuring an atmospheric pressure; and an A/F sensor 37 serving as an air-fuel ratio sensor measuring an air-fuel ratio of exhaust gas in a section upstream with respect exhaust catalyst device 9.

Crank angle sensor 33 is structured to measure an engine speed of internal combustion engine 1.

Accelerator opening sensor 34 is structured to measure an accelerator opening degree being an operation amount of the accelerator pedal and an accelerator change speed being an operation speed of the accelerator pedal. Boost pressure sensor 35 is structured to measure, as the boost pressure, a pressure in intake passage 2 (i.e., an intake pressure) in a section downstream with respect to throttle valve 8. A/F sensor 37 is a so-called wide area type air-fuel ratio sensor that has a substantially linear output characteristic with respect to the air-fuel ratio of exhaust gas.

Control unit 31 is connected to a transmission controller 41 via an in-vehicle network 42. Transmission controller 41 controls a gear ratio of transmission 23. Control unit 31 and transmission controller 41 are configured to interchange required information (i.e., signals) therebetween. Transmission controller 41 outputs information of a current gear position to control unit 31. Control unit 31 outputs a gear change command for transmission 23 to transmission controller 41.

Based on the measurement signals from the various sensors, control unit 31 optimally controls an injection amount and an injection timing of fuel injected from the fuel injectors, an ignition timing of spark plugs 5, and an amount of intake air, while controlling the air-fuel ratio of internal combustion engine 1.

Control unit 31 calculates a required load of internal combustion engine 1 (i.e., a load of internal combustion engine 1) from a measured value of accelerator opening sensor 34.

Figure 2:
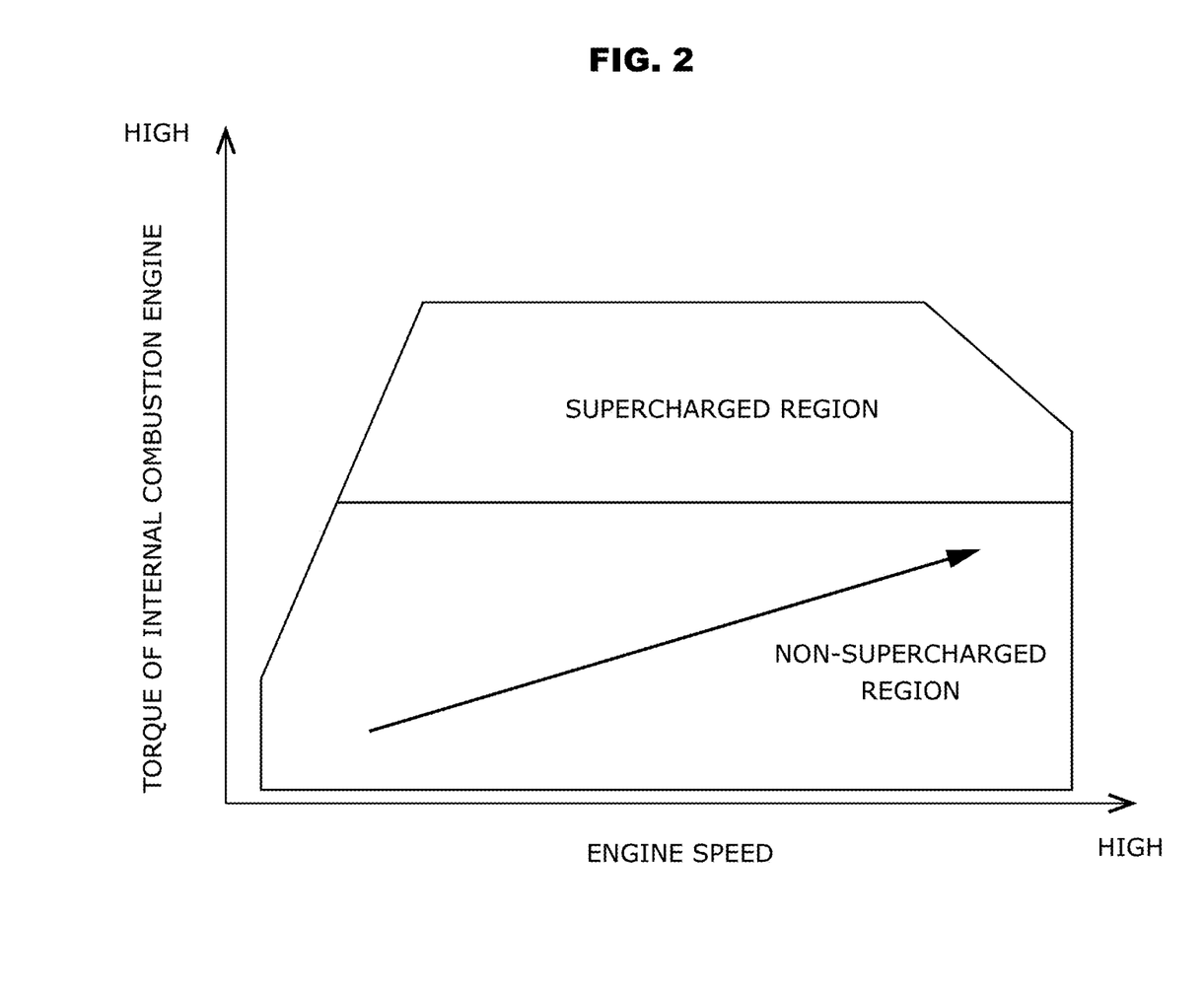
FIG. 2 is an illustrative view schematically showing a supercharged region and a non-supercharged region of the internal combustion engine.

FIG. 2 is an illustrative view schematically showing a supercharged region and a non-supercharged region of internal combustion engine 1. Internal combustion engine 1 is supercharged in the supercharged region, and is not supercharged in the non-supercharged region. Internal combustion engine 1 has the supercharged region as a high torque region, and has the non-supercharged region as a low torque region. In the supercharged region, the opening degree of waste gate valve 19 is placed under a feedback control in order to bring the boost pressure of internal combustion engine 1 to a target value. In the non-supercharged region, waste gate valve 19 is fully opened.

In response to upshift and vehicle acceleration in the non-supercharged region as shown by an arrow in FIG. 2, the ignition timing of internal combustion engine 1 is retarded for torque down. The torque down is performed to set an engine speed after the upshift to agree with an engine speed before the upshift. On this occasion, the retardation of the ignition timing raises energy of exhaust gas and may cause spontaneous supercharging in internal combustion engine 1.

In view of the above, in response to upshift of transmission 23 during operation of internal combustion engine 1 in the non-supercharged region, recirculation valve 16 is opened although the vehicle is being accelerated. Then, in response to completion of the upshift of transmission 23 during operation of internal combustion engine 1 in the non-supercharged region, termination of the retardation of the ignition timing and closure of recirculation valve 16 are implemented at timings different from each other.

Thus, the vehicle is configured to retard the ignition timing of internal combustion engine 1 so as to reduce a torque generated in internal combustion engine 1 while opening recirculation valve 16, in response to upshift of transmission 23 and acceleration of the vehicle. Furthermore, the vehicle is configured to implement termination of the retardation of the ignition timing and closure of recirculation valve 16 at different timings (i.e., timings shifted from each other), in response to completion of the upshift of transmission 23. In other words, control unit 31 serving as the controller is configured to: retard the ignition timing so as to reduce the torque generated in internal combustion engine 1 while opening recirculation valve 16, in response to upshift of transmission 23; and implement the termination of the retardation of the ignition timing and the closure of recirculation valve 16 at different timings, in response to completion of the upshift of transmission 23.

Figure 3:
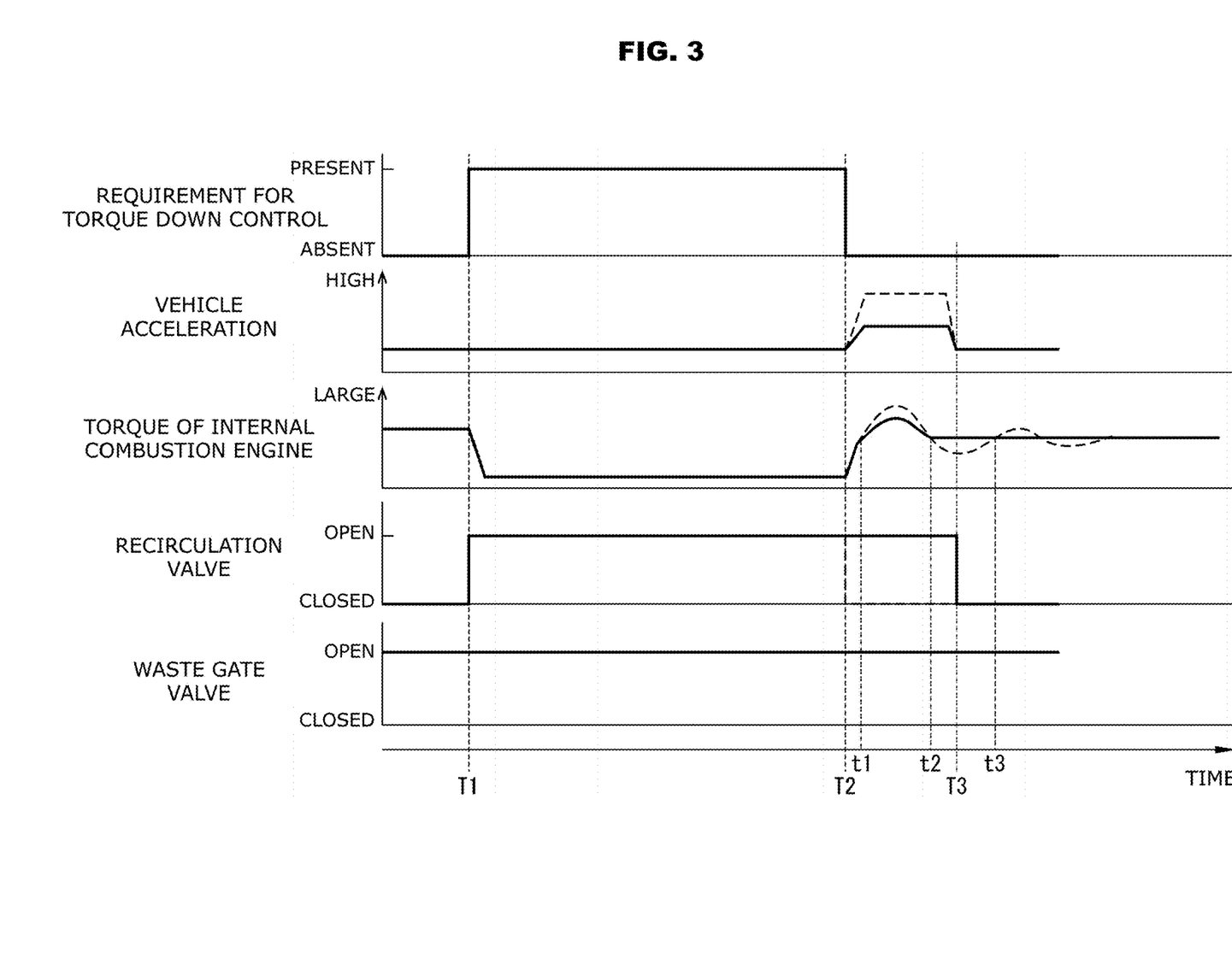
FIG. 3 is a time chart upon implementation of a torque down control.

FIG. 3 is a time chart upon implementation of a torque down control, and contrastingly shows: presence or absence of a requirement for the torque down control (i.e., a requirement for the ignition timing retardation); the acceleration of the vehicle; the torque of internal combustion engine 1; the opening degree of recirculation valve 16; and the opening degree of waste gate valve 19. The presence or absence of the requirement for the torque down control (i.e., the requirement for the ignition timing retardation) means presence or absence of a request for executing the torque down control.

At a time instant T1, the upshift of transmission 23 is started, recirculation valve 16 is opened, and the ignition timing retardation of internal combustion engine 1 is started. At a time instant T2, the upshift of transmission 23 is completed, and the ignition timing retardation of internal combustion engine 1 is terminated. At a time instant T3, recirculation valve 16 is closed.

If recirculation valve 16 is closed at time instant T2 at which the ignition timing retardation is terminated, a torque increase due to the closure of recirculation valve 16 and a torque increase due to the termination of the ignition timing retardation overlap with each other. In such case, as shown by a broken line in FIG. 3, the acceleration of the vehicle temporarily becomes greater after the completion of the upshift of transmission 23, which is implemented during operation of internal combustion engine 1 in the non-supercharged region, than the acceleration before the upshift of transmission 23.

Furthermore, as shown by a broken line in FIG. 3, the torque of internal combustion engine 1 greatly fluctuates during a process to return to a state before the upshift of transmission 23.

Thus, in case of implementing the termination of the ignition timing retardation of internal combustion engine 1 and the closure of recirculation valve 16 at a same timing, the torque of internal combustion engine 1 after time instant T2 converges to a target value with repetitive fluctuation, as shown by the broken line in FIG. 3.

The following details changes of the torque shown by the broken line in FIG. 3. Time instants t1, t2, and t3 are timings at which the torque of internal combustion engine 1 passes through (i.e., crosses) the target torque.

During a time period from time instant T2 to time instant t1, the torque of internal combustion engine 1 increases gradually due to restriction in change rate of the ignition timing. During this time period, the torque of internal combustion engine 1 is less than the target torque, and accordingly an amount of air and an amount of fuel are set to be greater than target values.

During a time period from time instant t1 to time instant t2, the torque of internal combustion engine 1 is higher than the target torque due to the air amount having been increased during the time period from time instant T2 to time instant t1, although the ignition timing of internal combustion engine 1 has already returned to an original ignition timing. During the time period from time instant t1 to time instant t2, the air amount is reduced below the target value in order to lower the torque of internal combustion engine 1.

During a time period from time instant t2 to time instant t3, the torque of internal combustion engine 1 is lower than the target torque due to the air amount having been reduced during the time period from time instant t1 to time instant t2. During the time period from time instant t2 to time instant t3, the air amount is increased above the target value in order to raise the torque of internal combustion engine 1.

After time instant t3, the reduction of the air amount below the target value and the increase of the air amount above the target value are alternatively implemented in order to cause the torque of internal combustion engine 1 to converge to the target torque.

The vehicle may deteriorate in operation performance due to increase in the acceleration after the upshift of transmission 23 over the acceleration before the upshift of transmission 23. This is because the increase in the acceleration after the upshift of transmission 23 over the acceleration before the upshift of transmission 23 increases a feeling of being pushed forward given to a passenger.

In view of the foregoing, the vehicle according to the above embodiment is configured to close recirculation valve 16 at time instant T3 that is different from time instant T2 at which the ignition timing retardation of internal combustion engine 1 is terminated. In detail, the vehicle is configured to terminate the ignition timing retardation of internal combustion engine 1 at time instant T2 being the timing of completion of the upshift of transmission 23, and then close recirculation valve 16 at time instant T3 being a timing after a predetermined time period from the termination of the ignition timing retardation.

This serves to, as shown by a solid line in FIG. 3, suppress the acceleration of the vehicle from becoming temporarily greater subsequently to the completion of the upshift of transmission 23, which is implemented during operation of internal combustion engine 1 in the non-supercharged region, than the acceleration before the upshift of transmission 23.

Thus, the vehicle according to the above embodiment is configured such that the timing of termination of the ignition timing retardation of internal combustion engine 1 does not overlap with the timing of closure of recirculation valve 16. This serves to suppress an amount of torque recovery subsequent to the completion of the upshift of transmission 23 from increasing more than expected, and thereby reduce the acceleration of the vehicle after gear change.

Furthermore, as shown by the solid line in FIG. 3, the torque of internal combustion engine 1 is suppressed from fluctuating upon returning to the state before the upshift of transmission 23, which is implemented during operation of internal combustion engine 1 in the non-supercharged region, subsequently to the completion of the upshift of transmission 23.

The torque fluctuation of internal combustion engine 1 subsequent to the termination of the ignition timing retardation of internal combustion engine 1 has a cycle correlated to the engine speed of internal combustion engine 1 and the gear ratio of transmission 23.

Accordingly, a time period (i.e., a delay time) from the termination of the ignition timing retardation to the closure of recirculation valve 16 is determined and set with reference to the engine speed of internal combustion engine 1 and the gear ratio of transmission 23 (e.g., the gear ratio after the upshift). In other words, recirculation valve 16 is closed at a timing determined and set with reference to the engine speed of internal combustion engine 1 and the gear ratio of transmission 23.

Specifically, the timing for closing recirculation valve 16 is set to a timing at which the torque fluctuating due to the termination of the ignition timing retardation of internal combustion engine 1 has a local minimum value for the first time. Otherwise, the timing for closing recirculation valve 16 may be set to not the timing at which the fluctuating torque of internal combustion engine 1 has a local minimum value for the first time, but a timing at which the fluctuating torque of internal combustion engine 1 becomes less than the target torque.

The time period (i.e., the delay time) from the termination of the ignition timing retardation of internal combustion engine 1 to the closure of recirculation valve 16 lengthens with increase in engine speed of internal combustion engine 1 (i.e., engine speed upon the upshift).

Furthermore, the time period from the termination of the ignition timing retardation of internal combustion engine 1 to the closure of recirculation valve 16 lengthens with increase in gear ratio of transmission 23 (e.g., gear ratio after the upshift).

The configuration of determining the timing for closing recirculation valve 16 as described above serves to suppress the torque of internal combustion engine 1 from fluctuating subsequently to the termination of the ignition timing retardation of internal combustion engine 1.

In addition, center bearing 19 is controlled to be fully open during the period during which recirculation valve 16 is open, in order to avoid interference with recirculation valve 16.

Figure 4:
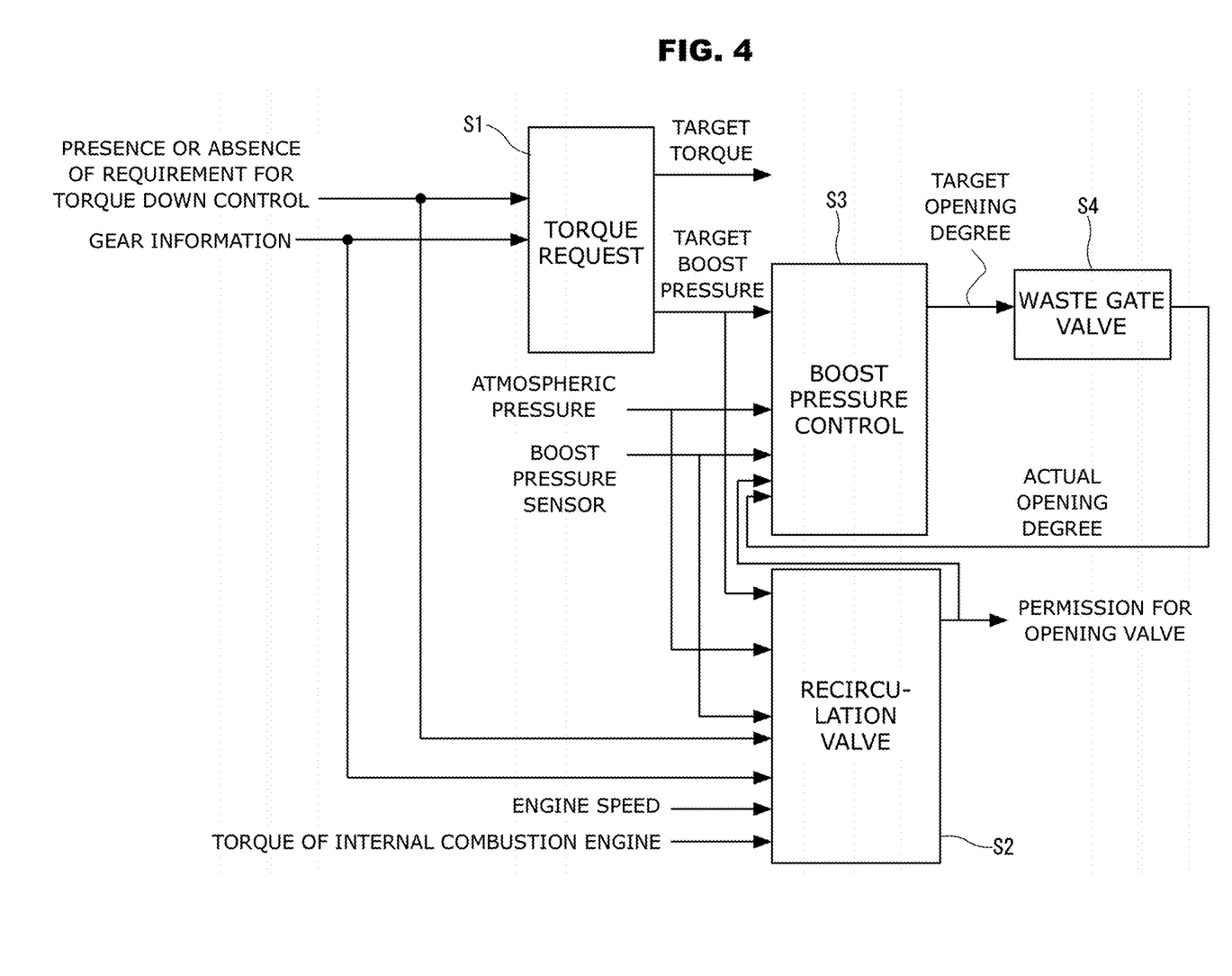
FIG. 4 is an illustrative view schematically showing contents of control on the vehicle.

FIG. 4 is an illustrative view schematically showing contents of control on the vehicle. Step S1 is calculation of a torque request of internal combustion engine 1, based on the presence or absence of the requirement for the torque down control (the requirement for the ignition timing retardation) and gear information of transmission 23 such as the gear ratio. The torque request is reflected to, for example, the target torque and a target boost pressure. Step S2 is permission for opening recirculation valve 16, depending on: the presence or absence of the requirement for the torque down control (the requirement for the ignition timing retardation); the gear information of transmission 23 such as the gear ratio; the target boost pressure; the atmospheric pressure; the measurement signal of boost pressure sensor 35 (i.e., the actual boost pressure); the engine speed of internal combustion engine 1; and the torque of internal combustion engine 1. Step S3 is calculation of a target opening degree of waste gate valve 19, for implementing a boost pressure control based on the target boost pressure, the atmospheric pressure, the measurement signal of boost pressure sensor 35 (i.e., the actual boost pressure), an opening state of recirculation valve 16, and an actual opening degree of waste gate valve 19. The actual opening degree of waste gate valve 19 may be measured with use of a sensor. Step S4 is execution of a control on waste gate valve 19 to achieve the target opening degree of waste gate valve 19 calculated in step S3.

Figure 5:
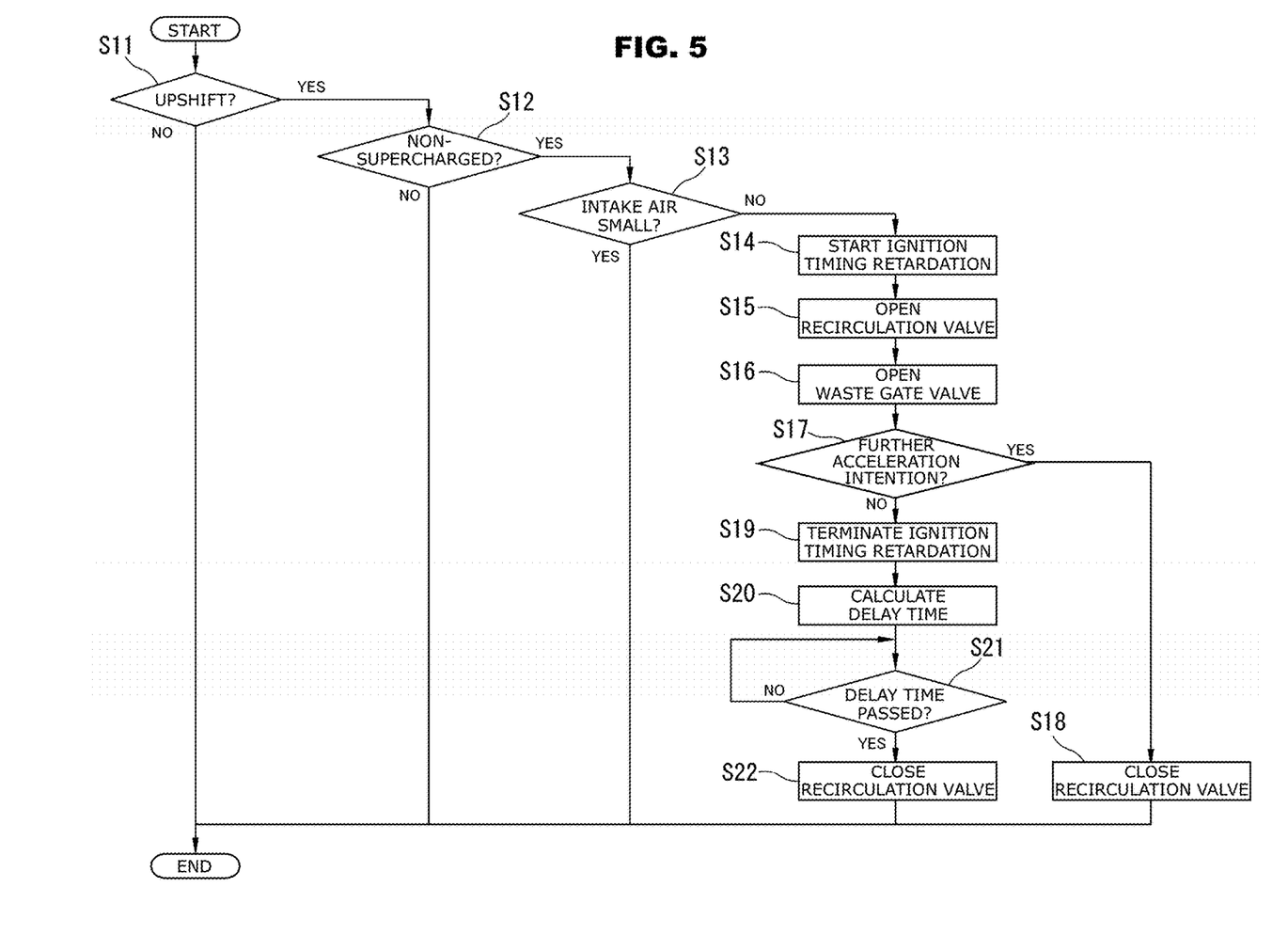
FIG. 5 is a flow chart of control on the vehicle.

FIG. 5 is a flow chart of control on the vehicle according to the embodiment described above.

Step S11 is determination of whether the upshift has been implemented or not. If determined that the upshift has been implemented in step S11, step S12 is executed. If determined that the upshift has not been implemented in step S11, the routine this time is terminated.

Step S12 is determination of whether the vehicle is accelerated within the non-supercharged region or not. If determined that the vehicle is accelerated within the non-supercharged region in step S12, step S13 is executed. If determined that the vehicle is accelerated not within the non-supercharged region in step S12, the routine this time is terminated.

Step S13 is determination of whether the intake air amount is small or not. Specifically, if the intake air amount is equal to or greater than a predetermined value, or if a change amount of the intake air amount is equal to or greater than a predetermined value, the intake air amount is determined to be not small, and step S14 is executed. If the intake air amount is less than the predetermined value, or if the change amount of the intake air amount is less than the predetermined value, the intake air amount is determined to be small, and the routine this time is terminated.

Step S14 starts the ignition timing retardation of internal combustion engine 1. The ignition timing retardation is implemented with a retardation amount set depending on, for example, a speed difference between an input shaft rotational speed and an output shaft rotational speed of a clutch of transmission 23. Furthermore, the ignition timing retardation may be implemented with a reference ignition timing set to an ignition timing of Minimum advance for the Best Torque (MBT), or a most advanced ignition timing being a knock limit. Step S15 opens recirculation valve 16. Step S16 opens waste gate valve 19.

Step S17 is determination of whether an intention for further acceleration is present or not: specifically, determination of whether a change speed of the accelerator pedal has increased, or whether operation of internal combustion engine 1 has been shifted from the non-supercharged region to the supercharged region. If determined that the intention for further acceleration is present in step S17, step S18 is executed. Step S18 closes recirculation valve 16. Thereafter, the ignition timing retardation of internal combustion engine 1 is terminated in response to completion of the upshift of transmission 23.

If determined that the intention for further acceleration is not present in step S17, step S19 is executed. Step S19 terminates the ignition timing retardation of internal combustion engine 1 in response to completion of the upshift of transmission 23. Step S20 is calculation of the time period (i.e., the delay time) from the termination of the ignition timing retardation of internal combustion engine 1 to closure of recirculation valve 16. The delay time is set based on the engine speed of internal combustion engine 1 and the gear ratio of transmission 23 (e.g., the gear ratio after the upshift). Step S21 is determination of whether the delay time has passed after the termination of the ignition timing retardation of internal combustion engine 1 or not. Step S22 closes recirculation valve 16.

Although the above specifically describes the embodiment of the present invention, the present invention is not limited to this embodiment, but may be variously modified within scope of technical ideas of the invention. The above embodiment relates to a vehicle control method and a vehicle control device.

The invention claimed is:

1. A vehicle control method for a vehicle including an internal combustion engine, a transmission structured to perform gear change for output of the internal combustion engine, a supercharger structured to supercharge intake air of the internal combustion engine, a recirculation passage connected to an intake passage of the internal combustion engine so as to bypass a compressor of the supercharger, a recirculation valve disposed in the recirculation passage, a turbine of the supercharger disposed in an exhaust passage of the internal combustion engine, a bypass passage connected to the exhaust passage so as to bypass the turbine, and a waste gate valve disposed in the bypass passage, the vehicle control method comprising:
   in response to upshift of the transmission, opening the recirculation valve and the waste gate valve and retarding an ignition timing; and
   in response to completion of the upshift of the transmission, implementing termination of the retardation of the ignition timing and closure of the recirculation valve at different timings,
   wherein the timing of the closure of the recirculation valve is determined depending on an engine speed of the internal combustion engine or a gear ratio of the transmission.

2. The vehicle control method as claimed in claim 1, wherein the closure of the recirculation valve is implemented after the termination of the retardation of the ignition timing.

3. The vehicle control method as claimed in claim 2, wherein a time period from the termination of the retardation of the ignition timing to the closure of the recirculation valve lengthens with increase in engine speed of the internal combustion engine upon the upshift of the transmission.

4. The vehicle control method as claimed in claim 2, wherein a time period from the termination of the retardation of the ignition timing to the closure of the recirculation valve lengthens with increase in gear ratio of the transmission after the upshift of the transmission.

5. The vehicle control method as claimed in claim 1, wherein the timing of the closure of the recirculation valve is set to a timing at which a torque of the internal combustion engine fluctuating due to the termination of the retardation of the ignition timing has a local minimum value.

6. The vehicle control method as claimed in claim 1, wherein the internal combustion engine is in a non-supercharged region.

7. A vehicle control device comprising:
   an internal combustion engine;
   a transmission structured to perform gear change for output of the internal combustion engine;
   a supercharger structured to supercharge intake air of the internal combustion engine;
   a recirculation passage connected to an intake passage of the internal combustion engine so as to bypass a compressor of the supercharger;
   a recirculation valve disposed in the recirculation passage;
   a turbine of the supercharger disposed in an exhaust passage of the internal combustion engine;
   a bypass passage connected to the exhaust passage so as to bypass the turbine;
   a waste gate valve disposed in the bypass passage; and
   a controller configured to:
      in response to upshift of the transmission, open the recirculation valve and the waste gate valve and retarding an ignition timing; and
      in response to completion of the upshift of the transmission, implement termination of the retardation of the ignition timing and closure of the recirculation valve at different timings,
      wherein the timing of the closure of the recirculation valve is determined depending on an engine speed of the internal combustion engine or a gear ratio of the transmission.

* * * * *